US005649005A

United States Patent [19]
Lynch et al.

[11] Patent Number: 5,649,005
[45] Date of Patent: Jul. 15, 1997

[54] PC WITH TELEPHONY EXCHANGE FUNCTION

[75] Inventors: John Cornelius Lynch; Tod Allen Rikley; Peter Tarle; David Ward; Metodej Valentik; André Michael Cyr, all of Belleville, Canada

[73] Assignee: Northern Telecom Limited, Montreal, Canada

[21] Appl. No.: 499,440

[22] Filed: Jul. 7, 1995

[51] Int. Cl.[6] .................................................. H04M 3/00
[52] U.S. Cl. ........................ 379/242; 379/67; 379/225; 379/418; 379/420; 370/364
[58] Field of Search .............................. 379/198, 242, 379/201, 94, 93, 96, 97, 156, 225, 418, 420, 67; 370/58.1, 58.2, 58.3, 67, 85.1, 85.9, 85.11, 85.13, 91, 364, 298, 299, 363; 395/306, 308, 311

[56] References Cited

U.S. PATENT DOCUMENTS

| | | | |
|---|---|---|---|
| 4,541,088 | 9/1985 | Sarson | 370/364 |
| 4,581,733 | 4/1986 | Sarson et al. | 370/364 |
| 4,640,989 | 2/1987 | Riner | 379/94 |
| 4,916,726 | 4/1990 | Morley, Jr. et al. | 379/218 |
| 5,420,852 | 5/1995 | Anderson et al. | 379/218 |
| 5,463,684 | 10/1995 | Morduch et al. | 379/201 |
| 5,483,577 | 1/1996 | Gulick | 379/201 |

FOREIGN PATENT DOCUMENTS

0192894A2  9/1986  European Pat. Off. ......... H04Q 3/545

Primary Examiner—Ahmad F. Matar
Assistant Examiner—Scott Wolinsky
Attorney, Agent, or Firm—J. E. Moorhouse; George MacGregor

[57] ABSTRACT

A key telephone system (KTS) or a telephone private branch exchange (PBX) card is integrated into a personal computer to provide telephone system features. The telephone card includes a call controller, a switching network and an interface bus controller for coupling data signals between the PCI bus and an internal bus of the call controller whereby the telephone card is able to communicate with resources of the PC such as a LAN and a hard disk bulk memory for executing telecommunications functions. In this arrangement the PCI bus must carry both asynchronous data processing and control signals as well as reformatted synchronous signals. The addition of a synchronous bus for transporting synchronous signals is used to couple these signals between the switching network, a telephony features controller and the hard disk bulk memory. The use of the synchronous bus provides for improved telephone traffic capacity and PC functionality.

6 Claims, 4 Drawing Sheets

1

PC WITH TELEPHONY EXCHANGE FUNCTION

FIELD OF THE INVENTION

The present invention is in the field of telecommunications and relates to a combination of a private telephone system with a personal computer (PC). More particularly a private telephone system often referred to as a PBX or a key telephone system, is integrated within a PC and relies upon various elements of the PC for functions usually provided by telephone-line-connected apparatus, for example voice mail and automated attendant features.

BACKGROUND OF THE INVENTION

Traditional telephone systems include a common controller, sometimes referred to as a call controller, which is responsive to service requests signalled from associated telephone sets for causing a switching apparatus or network to provide telephone communication paths between calling and called telephone sets. More than twenty years ago a PBX was first marketed by the Northern Electric Company Limited with the trademark SL 1. In this PBX the call controller is provided by a digital processor with associated memory. The memory includes stored data for defining terminal locations of telephone sets, and instruction sets by which the digital processor is operative for generating connection instructions. Connection memories in a time division multiplex (TDM) switching network contain the connection instructions generated by the call controller for directing transfers of pulse code modulated (PCM) information bits between frame organized synchronous channels to provide communications paths between telephone sets. Each telephone set is served by a line circuit which couples information between a channel in the switching network and the telephone set.

Signalling between the telephone sets and the call controller is provided for with peripheral circuitry which collects signalling information in a channel reserved for this purpose from the line circuits as it occurs and forwards it to the call controller. Conversely signalling destined for individual telephone sets is distributed to the respective line circuits via the same channel.

Control and status of the line circuits and of the switching network is exercised by the call controller via a control bus which includes address, data, control, and timing leads.

A more complete review of the first marketed SL1 PBX is available with reference to articles published by Bell Northern Research Limited in Telesis in February of 1975.

The essence of the typical PCM TDM telephone exchange is embodied in its telephony software which provides for basic telephone call operations as well as the exercise of a multitude of telephony features and conveniences. One of the distinguishing features of the telephony software is that of having a plurality of hierarchically organized priority interrupts which permits the call controller to shelve a lower priority task when a higher priority task comes along. Judicial assignments of the priorities of tasks permits the PBX to respond apparently instantaneously to user requests for service and telephony features. Hence the call controller is always occupied by the highest priority task that is available at the time. This is in contrast to the typical general purpose computer which is batch processing oriented to complete one task at a time.

The evolution of hardware and software technology and economies of scale have reduced physical size while increasing functionality to such an extent that computers have in the last 10 years become personal and commonplace on the users desk top. PBXs have experienced a similar evolution now requiring less than a cubic meter of space where 20 years ago a large equipment room was needed to house the same or less functionality.

During this evolution the development of telephony features such as automatic call distribution, voice messaging, networking and automated attendant to mention but a few, has brought about the addition of feature servers to the basic PBX. The feature sever permits the execution of feature rich telephony services without unduly burdening the call controller or otherwise detracting from the basic telephony functions of call set ups and take downs. In many examples the features server is based upon the traditional general purpose computer which is batch processing oriented to complete one task at a time. As the personal computer (PC) has evolved with faster and faster machine speeds it has been realized that telephone system functionality can be incorporated into a PC through the application of switching emulation software and the addition of hardware interface circuits for connecting a few lines and trunks with an internal PC communications bus. Various of the PC's resources can be put to use in providing telephony features that would typically have required a features server. In very small systems a significant cost advantage may be realized as the PC may still be used for other traditional PC tasks while in addition screen based telephony features can also be implemented via other user's PCs coupled through a local area network (LAN). Author Harry Newton, in an article titled "The Telephony Server and The Communicating PC Client", published in the April 1995 issue of TELECONNECT speculates on the various communications services that will become available via the PC and mentions several product offerings.

One of the current problems with using a PC for switching telecommunications is that neither the existing telecommunications software nor the principles upon which it is based are directly applicable within the PC architecture. The existing telecommunications software has been developed over the past more than 20 years for switching facility call controller architectures that have been specialized toward the telecommunications task with the assumption that call control is provided virtually instantaneously in apparent real time. One of the primary restraints to providing telecommunications switching in a PC is the absence of fully featured robust telecommunications software for the PC architecture.

This problem is somewhat overcome in a very recent example of the combination of a PBX call controller within a personal computer. This has an advantage that the PBX call controller is able to rely upon power and bulk memory resources of the PC. Furthermore PBX features such as voice mail and automated attendant, usually provided by a telecommunications features server, can be provided by the physical resources of the PC. Although the processor in the personal computer and the call controller of the PBX have dissimilar and non compatible input/output (I/O) bus structures, each is able to communicate with the other and use common bulk memory resources via a standard personal computer industry (PCI) local bus. Each element communicates with the PCI bus via a PCI bus controller or interface. Examples of integrated circuits for this purpose are identified in the code series S5930–S5933 and are available from Applied Micro Circuits Corporation at 6195 Lusk Blvd. in San Diego, Calif. 92121. In this example successful transmission of telephony signals of synchronous origin via the PCI bus relies upon there being sufficient PCI bus bandwidth to accommodate all of the demands for such telephony transmissions as well as the requirements for normal PC operations. If the telephony traffic is sufficiently heavy to substantially dominate the PCI bus there is no practical advantage to the combination of the PBX and the PC.

SUMMARY OF THE INVENTION

It is an object of the invention to implement functional telecommunications switching within a typically available personal computer environment with the use of existing telecommunications software as is used in present day PBXs.

It is also an object of the invention to enhance the traffic capacity of a PBX featured PC while avoiding obvious interactive delays in performance of the PC and of telephony functions.

This and other objects of the invention are achieved in an example of the invention wherein a PBX card is adapted for coupling via connector insertion at a PCI local bus, as is typically carried by a mother board in the PC, and with the provision of a telephony feature controller card in the PC. The PBX card includes at least a call controller, a switching network and an interface bus controller for coupling data signals between the PC bus and an internal bus of the call controller whereby the call controller is able to communicate with resources of the PC for executing asynchronous telecommunications functions. The invention is characterized by a synchronous bus and a plurality of TDM bus interfaces which provide for communication of selected synchronous signal streams between the switching network and at least the telephony feature apparatus card whereby the capacity of the PCI local bus is substantially reserved for asynchronous data processing and control signals.

In a larger example one or more peripheral controllers are utilized to expedite repetitive functions such as line and trunk scanning and signalling and supervision on behalf of the call controller. In this example the peripheral controllers are also each interfaced with the PCI bus.

In accordance with an additional feature of the invention the telephony feature apparatus card is also adapted for connector insertion on the PCI local bus and includes an interface bus controller for coupling data signals between the PCI local bus and an internal bus of the telephony feature apparatus card whereby the telephony feature apparatus is able to communicate with resources of the PC as well as the PBX card for executing asynchronous telecommunications functions.

In yet another example the PBX card also includes a transmission line termination for coupling synchronous signal streams between the switching network and a group of remotely located telecommunications ports. In this arrangement the line and trunk circuits can be confined to a convenient remote utility space so as not to compromise the personal work space of the PC user.

In accordance with the invention a personal computer (PC) includes a telephone exchange feature for providing telephone service to a plurality of telephone sets. The PC includes;

a plurality of circuit cards including a data processor system card, a data input card, a data output card, a memory system card, a telephone system card with ports for providing for said telephone communications and a telephone server card for providing a telephone service feature;

a personal computer industry (PCI) local bus system for providing data communications between the circuit cards; and a synchronous signal (SS) local bus system for providing communications for signals of telephony origin or destination, between the telephone system card and at least another of the cards exclusive of the data processor system card, whereby typical personal computer usage activities are less likely to be compromised while processing, storage, and retrieval of telephony signals, in relation to provision of virtual real time telephony service features, are in progress.

Also provided, in accordance with the invention a method for providing telephone communications for a plurality of telephone users from a personal computer, comprising the steps of:

providing a plurality of electronic circuits within the personal computer including a data processor system, a data input, a data output, a memory system, a telephone system with ports for provision of said telephone communications, a telephone server for providing a telephone service feature and a power supply for supplying the circuits with energizing current;

communicating asynchronous data signals between the circuits via a personal computer industry (PCI local bus system; and communicating signals of telephony origin or destination, between the telephone system and others of the plurality of electronic circuits, exclusive of the data processor system via a synchronous signal (SS) local bus system whereby typical personal computer usage activities are less likely to be compromised by machine functions of processing, storing, and retrieving signals of telephony origin, in relation to provision of virtual real time telephony service features.

Also in accordance with the invention, in a process of operating an applications program in a user's PC for displaying a document which includes data for visual display and voice annotation data for sound production, a method of providing the sound production such that it is audible to the PC user without requiring that the user's PC have a voice sound reproduction facility, comprising the steps of:

within an other personal computer, providing a telephone system with ports for provision of telephone communications; coupling the user's PC and said other PC for communication with one another via a local area network (LAN);

transmitting voice annotation data asynchronously, via the LAN to said other PC, and in said other PC receiving and storing the voice annotation data; and in the telephone system;

providing a communication path to one of said ports being connected with a hands free telephone set located adjacent the user's PC, and synchronously retrieving the stored voice annotation data byte by byte and transmitting each byte to the port whereby the sound of the voice annotated data is audible to the PC user via the hands free telephone set.

The PBX call controller runs independent of the PC processor and clock but it uses the PC power supply, however the preferred reliability of telephone systems suggests the provision of an auxiliary power supply to bridge utility power outages.

BRIEF DESCRIPTION OF THE DRAWINGS

An example of the invention is described with reference to the accompanying drawings in which.

DESCRIPTION

Figure 1:
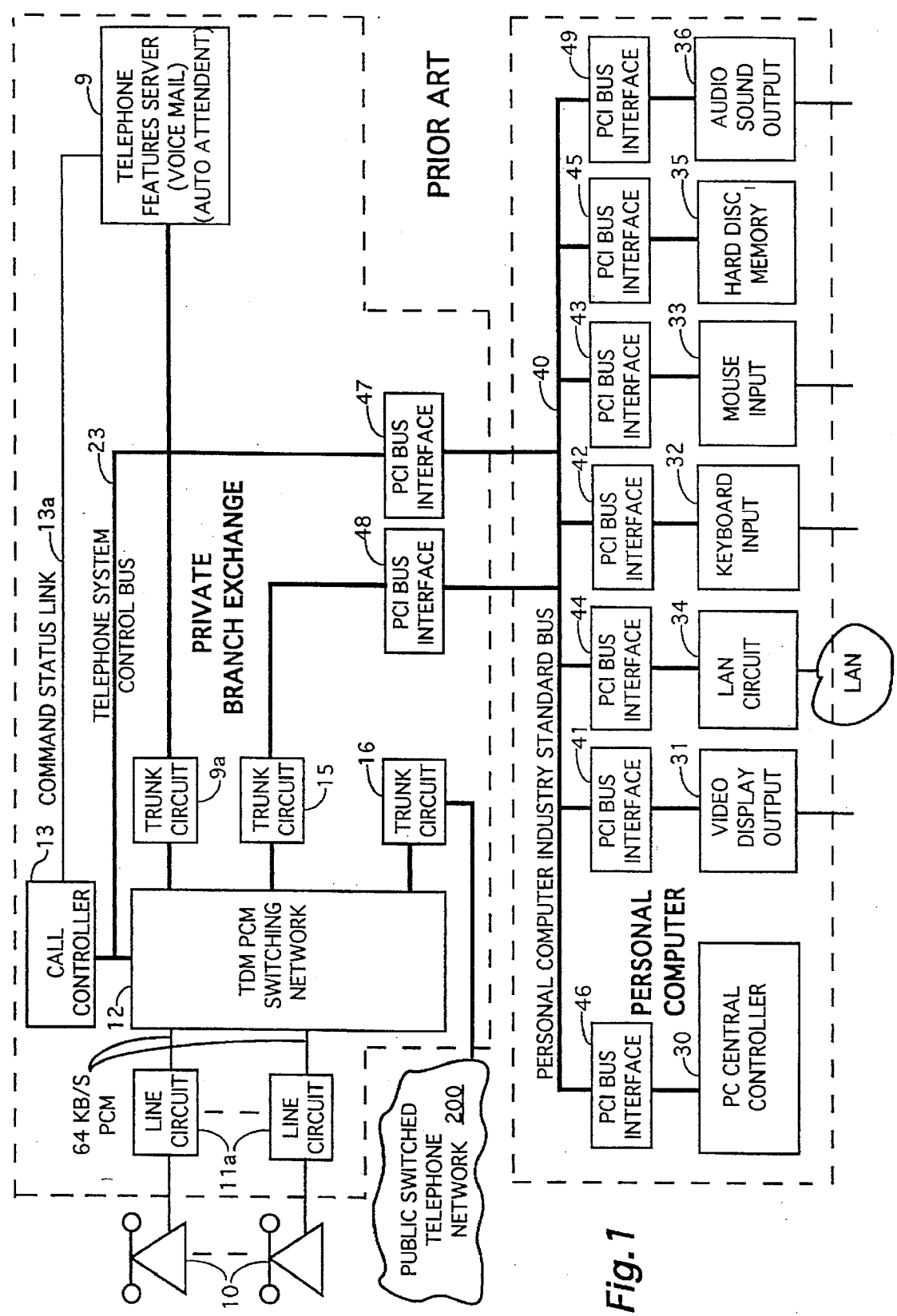
FIG. 1 illustrates an example of a prior known combination of a personal computer and a small private branch exchange.
Figure 2:
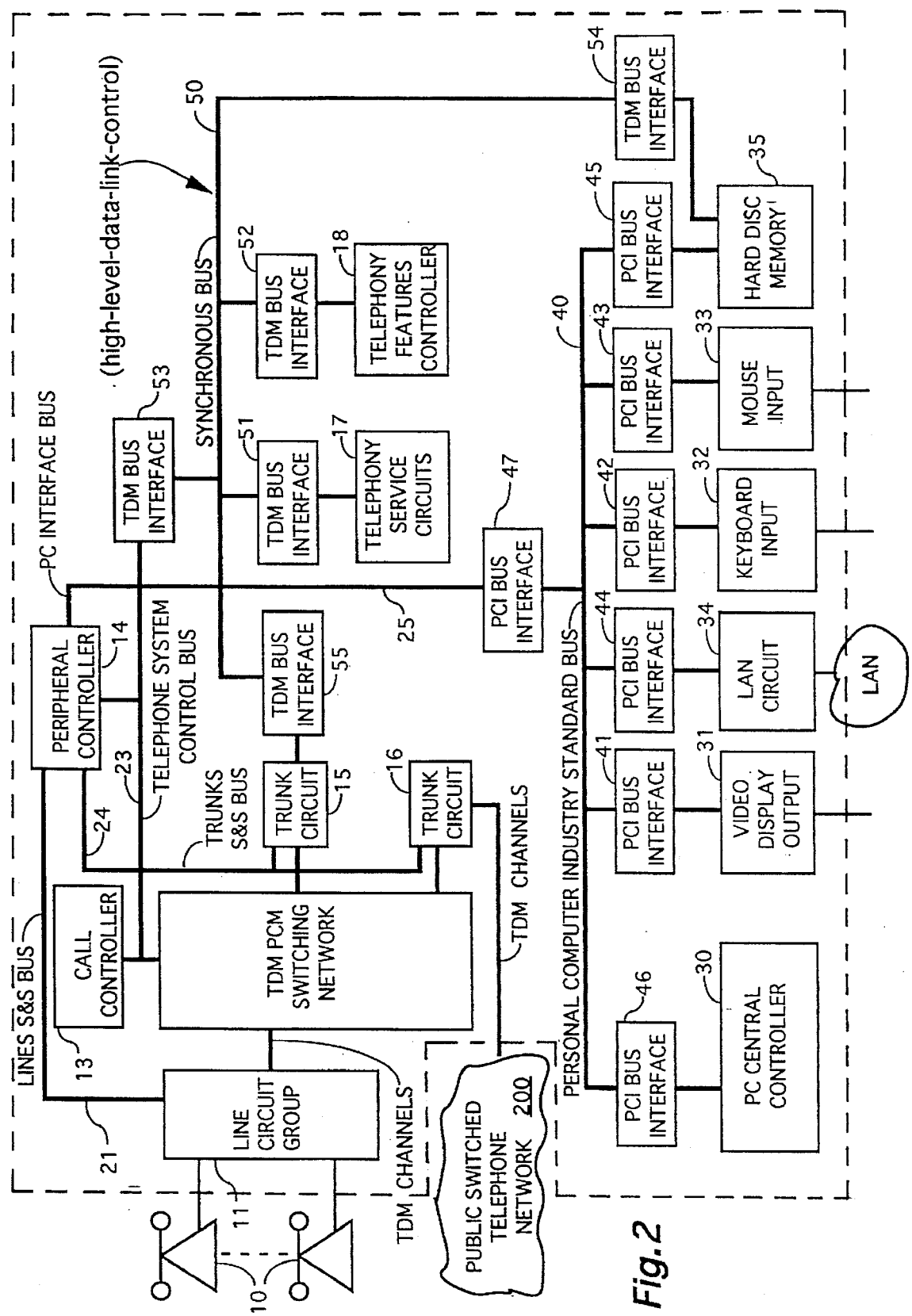
FIG. 2 in contrast to FIG. 1 is exemplary of the invention.

The invention is embodied in FIG. 2 which is more readily understandable first with reference to FIG. 1. FIG. 1 illustrates an example of the recent combination of a personal computer (PC) and a key telephone system or private branch exchange (PBX), wherein a call controller 13 and a TDM PCM switching network 12 are coupled with elements of the personal computer via a personal computer industry standard bus (PCI bus) 40. The PBX or key telephone system relies upon elements of the PC to provide for features such as abbreviated dialling for example, however with the exception of having a common power supply(not shown in FIG. 1), the system is independent of the PC central controller to the extent that plain ordinary telephone service (POTS) continues uninterrupted if the PC needs to be rebooted.

Considering FIG. 1, in the PBX several telephones 10 are connected by several line circuits 11a to the TDM PCM switching network 12. A trunk circuit 16 provides for a plurality of communications channels for connection to the public switched telephone network 200. A trunk circuit 9a provides for a plurality of communications channels for connection to a telephone features server 9, which in this example provides both voice mail and auto attendant features for users of the telephones 10. A trunk circuit 15 provides for a plurality of communications channels for connection to the personal computer via a PCI interface circuit 48 and the PCI bus 40. The trunk and line circuits are provided with communications paths through the TDM PCM switching network 12 which is controlled by the call controller 13 via a telephone system control bus 23. The telephone system control bus 23 includes data leads, address leads, timing and various control leads (not shown) by which the call controller 13 exchanges information with other elements connected to the bus. The personal computer typically includes elements such as a PC central controller 30; a video display output circuit 31; a keyboard input circuit 32; a mouse input circuit 33; a local area network (LAN) coupling circuit 34; a hard disc bulk memory unit 35; and an audio sound output card 36, for example. The audio sound output card 36 is often desired to provide loudspeaker reproducible signals of complex sounds such as music and voice and is preferred for gaming applications and voice annotated text electronic mail and word processing applications. Each of the elements 31–35, the PC central controller 30 and the audio sound output card 36, is coupled to communicate via the PCI bus 40 by one of PCI interface circuit 41–46, and 49 respectively, as shown. Of note the telephone system control bus 23 is interfaced with the PCI bus 40 via a PCI bus interface 47 so that the call controller 13 with the aid of the PC central controller 30 may call upon any of the elements of the PC for assistance in executing various telephony features.

As is well known the personal computer is useful for the execution of any of various applications programs as chosen by a PC user. Applications programs and data associated therewith are usually stored in the hard disc bulk memory unit 35, but may also be available from any other LAN connected source via the local area network (LAN) coupling circuit 34. The PBX is operative as directed by the call controller 13 in accordance with telephony call processing instruction sets stored therein, for setting up telephone calls by providing communications paths for same via the TDM PCM switching network 12. When a party in the telephone call hangs up the call controller 13 also withdraws the previously provided communications path. Telephony features may be supported by various elements of the PC working in concert for this purpose. For example screen based telephony features wherein the PC user controls the user's associated telephone (one of the telephones 10) may be executed via the PC user's key board and mouse with reference to the user's video display. The equivalent of telephony signalling and supervision signals are coupled via the LAN to the PC of FIG. 1 wherein these signals are translated into the operating protocol of the call controller 13 to effect the user's intentions at the user's telephone set. Likewise signalling and supervision from the call controller 13 is eventually distributed via the LAN and received by the user's PC to effect the desired visual indications on the display screen of the user's PC.

In FIG. 1 although the features server 9 is shown to be provided, such provision is expensive relative to the cost of the PC. The functions of the features server 9 can just as well be provided by elements of the PC being coupled with synchronous signal voice communications paths in the TDM PCM switching network 12 via the trunk circuit 15, the PCI bus interface 48 and the PCI bus 40. In a small system which characteristically has little voice features traffic this is usually a satisfactory and cost effective arrangement, however there may be enough synchronous signal communications demand on the PCI bus 40 to tend to monopolize the real time bandwidth of the bus and hence compromise the functions of both the PC and the telephony feature. With the passage of time, telephone systems tend to grow in size and traffic density and eventually this growth will dictate that the apparatus as exemplified in FIG. 1 will no longer be a practical provider of telephone services.

The system illustrated in FIG. 2 is exemplary of the invention and contains many elements which are similar to the elements of FIG. 1, which for convenience of explanation are identified with the same labels. The risk of monopolizing the PC facilities with synchronous signal handling chores is substantially reduced in the example embodiment illustrated in FIG. 2. Those elements of the system that handle synchronous communications or data of synchronous origin or destination are coupled with a synchronous bus 50 operated in this example in a high level data link control protocol, so that such data of telephony origin or destination do not compete with asynchronous data routinely carried by the PCI bus. Both synchronous signals and asynchronous signals are coupled with the synchronous bus 50 via TDM bus interface circuits 51–55 as shown. It should be noted that FIG. 2 does not show the features server 9. Furthermore as synchronous signals are substantially excluded from the PCI bus 40, the PCI bus interface 48 is not required. There are also several circuit additions to the PBX feature that are advantageous in this example. These are a peripheral controller 14, which is connected to a line circuit group 11 by a lines signalling and supervision bus 21, and is connected to the trunk circuits 15 and 16 by a trunks signalling and supervision bus 24. The functions of the peripheral controller 14 are well known to enhance the effectiveness of the call controller 13 by looking after scanning and other communications timing requirements. In this example the peripheral controller 14 also acts as a gateway to the PCI bus 40 via the PCI bus interface 47 and a PC interface bus 25. Telephony service circuits 17 for providing DTMF tones, multifrequency tones, as well as progress tones may optionally be coupled to the synchronous bus 50, thereby freeing some communications channels of the TDM PCM switching network 12 for telephony conversation or data link traffic.

It should be noted that FIG. 2 does not show the features server 9, however the features are now provided by a telephone features controller 18. The telephone features controller 18 performs well known voice message processing functions of grouping compressing and packetizing preparatory to efficient voice data storage in the hard disc bulk memory unit 35, and subsequently thereafter fetching expanding and synchronizing preparatory for delivering intelligible voice messages to the voice mail user. The management of these functions is expedited by the use of the HDLC (High Level Data Link Control) protocol consistent with the CCITT recommended standard.

Figure 3:
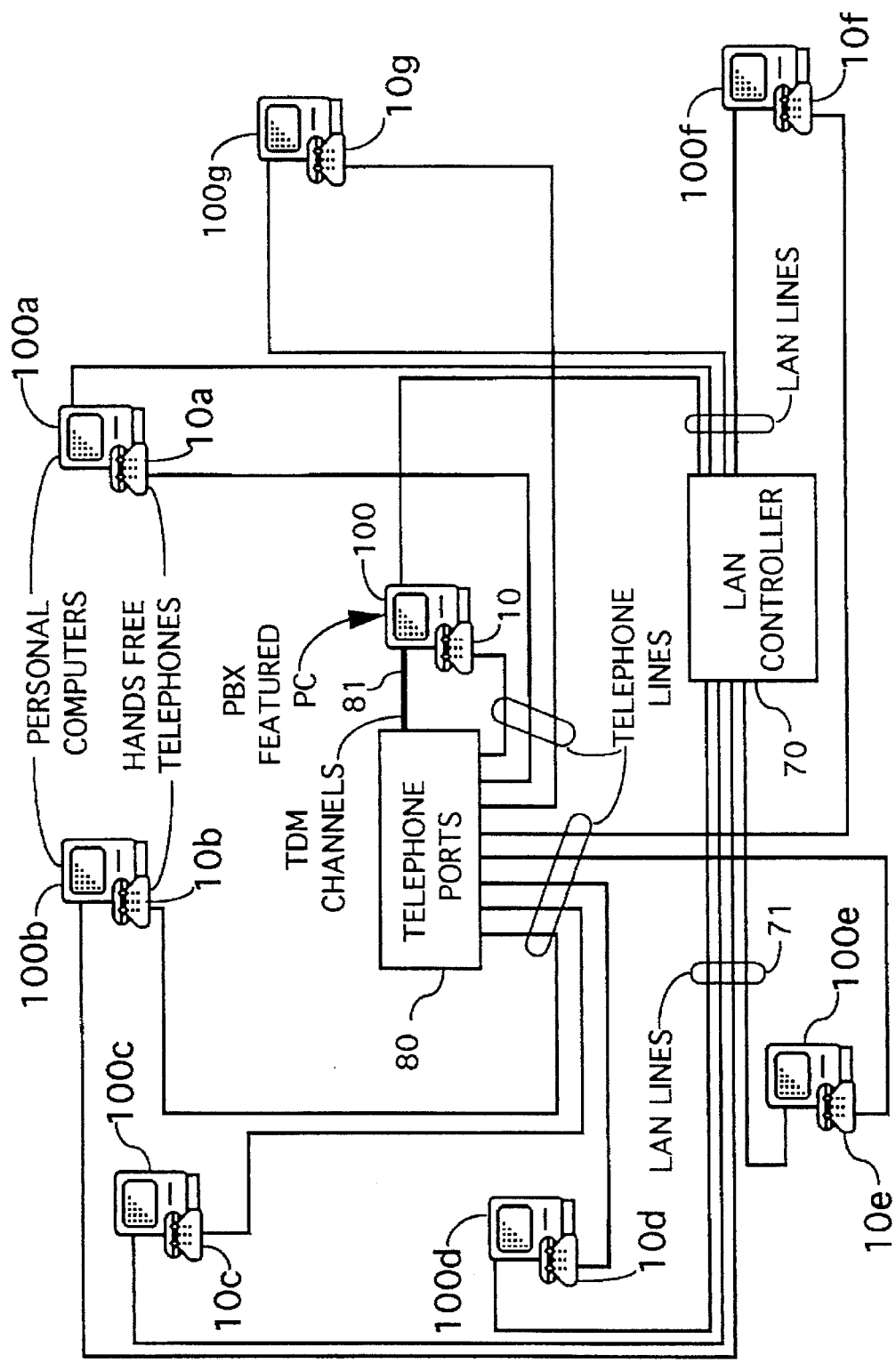
FIG. 3 is exemplary of a system for providing a feature of the invention wherein voice annotation data for sound production is made audible to the PC user via an adjacent hands free telephone set.

Substantial convenience may be derived with the integration of telephony, data and word processing and electronic mail and messaging as may be achieved in a system as exemplified in FIG. 3 which includes a PBX or key system featured personal computer. In FIG. 3 a PBX featured PC is shown at 100 with an adjacent hands free telephone set 10. The remaining PCs 100a–100g are each associated with an adjacent hands free telephone 10a–10g, but are not PBX featured. Each of the PCs 100, 100a–100g is linked by a LAN under the supervision of a LAN controller 70, while each of the telephones is connected to a telephone ports circuit 80 which is coupled via TDM channels to the PBX featured PC 100.

The system of FIG. 3 is exemplary of a system for providing a feature of the invention wherein voice annotation data for sound production is made audible to the PC user via a hands free telephone set which is activated as appropriate during the execution of a word processing, electronic mail application or the like. By this means the user's PC is functional for voice annotated documents without requiring its own dedicated voice sound reproduction facility. Within the system one of the personal computers includes a telephone system feature for example as illustrated in FIG. 2, with ports 80 for example the line circuit group 11 for provision of telephone communications. None of the PCs is required to have the audio sound output card 36, illustrated in FIG. 1. Voice annotations data is asynchronously transmitted from the user's PC to the other PCs via the LAN. The voice annotations data is received and stored by the one PC for transfer to the user's hands free telephone set. In the one PC, the telephone system responds by providing a communication path to one of the ports connected with the hands free telephone set located adjacent the user's PC. In the case of PC user application involving voice data such as voice annotated text, the voice annotations are fetched from the hard disc bulk memory unit 35 and processed by the telephone features controller 18, preparatory to coupling to the telephone hands free telephone set adjacent the PC user. At the same time the PC controller 30 requests a call see up and indicates the presence of voice data for the PC user to the call controller 13 via the peripheral controller 14. The call controller 13 responds by setting up a call to the hands free telephone and activating the set without the traditional ringing or alerting function of the typical call progress. The peripheral controller 14 invokes an OFF HOOK state at the user's hands free telephone set and synchronously retrieves the stored voice annotation data, byte by byte, and transmits each byte to the port whereby the sound of the voice annotated data is audible at the PC user's hands free telephone set.

Figure 4:
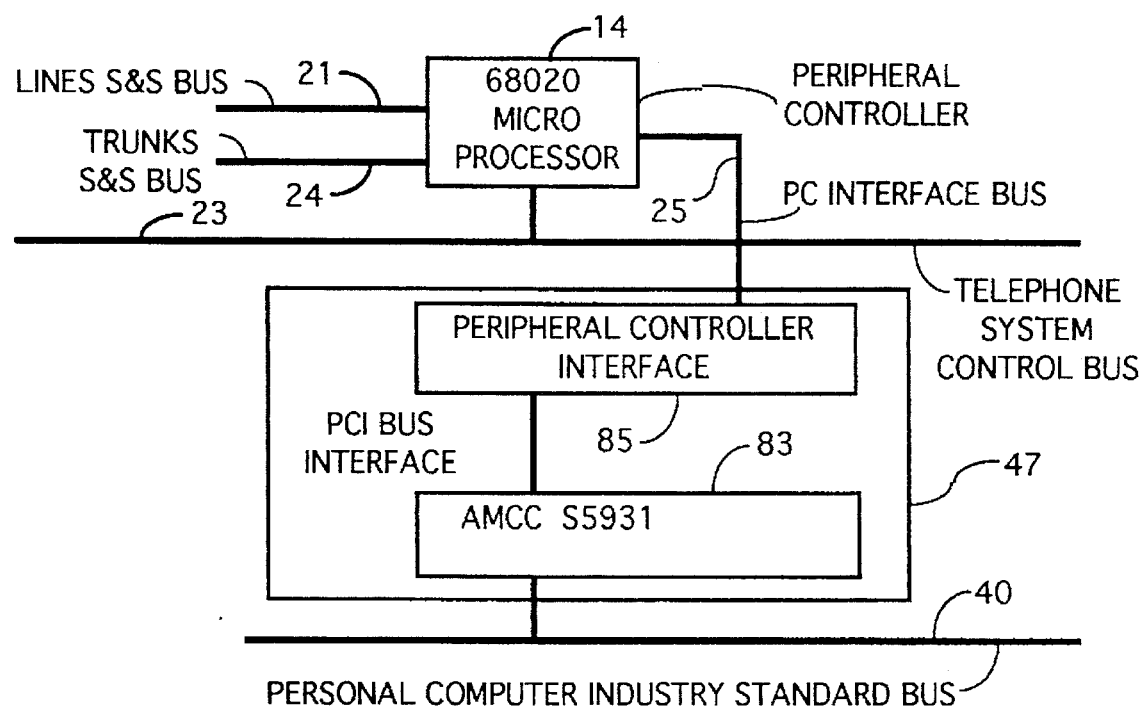
FIGS. 4 and 5 are exemplary of asynchronous and synchronous bus interfaces used to implement the system illustrated in FIGS. 2 and 3.

FIG. 4 illustrates one example of the peripheral controller 14 in the telephone system of FIG. 2, as it is interfaced with the PCI bus 40 for exchanging data with the elements of the personal computer. The peripheral controller 14 is not an essential element of small systems such as key systems but its use is well known to expedite call processing particularly in more heavily used feature rich PBXs, by relieving the call controller of repetitive scanning and internal signalling management functions. In this example the peripheral controller 14 is provided by a 68020 micro processor which is coupled to the PCI bus 40 by a circuit 83 selected from the S5930-3 series of integrated digital circuits. As the input/output requirements of the 68020 and S5930-3 are not directly compatible a peripheral control, a simple programmable logic array 85, was used to provide a suitable interface circuit in constructing this example.

Figure 5:
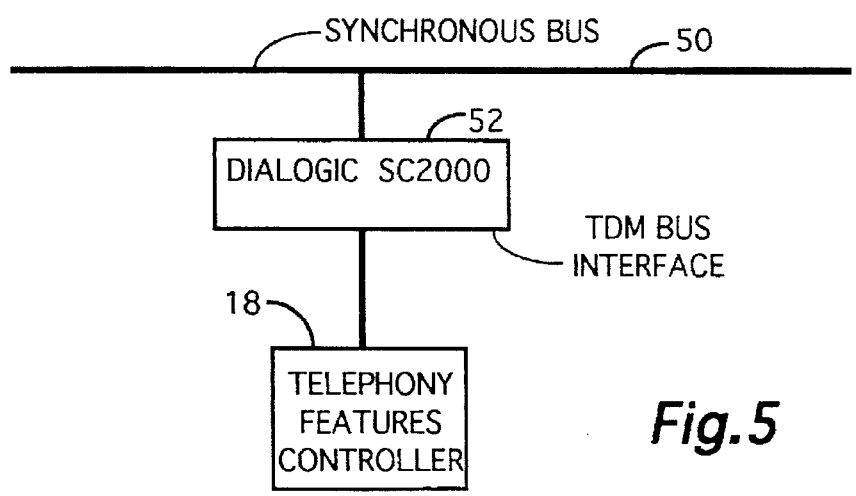

FIG. 5 illustrates an example of the TDM bus interface 52. In this example the telephone features controller 18, for example one of the 68000 series of microprocessors, receives voice data either in the form of packets from the hard disc memory 35 in FIG. 2 and retransmits the voice data in pulse code modulated format via a specified TDM PCM channel, or it receives PCM voice data from a specified TDM channel and thereafter compresses and packetizes the voice data preparatory for storage in the hard disc memory 35. The packetized voice data is conveyed to the hard disc memory via the synchronous bus 50. The TDM bus interface 52 in this example is provided by an integrated digital circuit SC2000 in a manner as illustrated in applications notes published by Dialog Corporation.

The scope of the invention exemplified in the forgoing description and in the accompanying drawings is defined in the appended claims, in terms familiar to those of typical skill in the digital electronic telephony.

What is claimed is:

1. A communications system for providing telephone communication between a plurality of telephone users, said system comprising a telephony control unit integrated in a personal computer;

said personal computer having a personal computer industry (PCI) local bus, a synchronous bus, a central processor connected to said PCI local bus via a first PCI bus interface, and memory means connected to said PCI local bus via a second PCI bus interface and connected to said synchronous bus via a first time division multiplex (TDM) bus interface;

said telephony control unit having a switching network for routing calls between said telephone users, said switching network connected to a call controller and to a peripheral controller, said call controller connected to said synchronous bus via a second TDM bus interface, said peripheral controller connected to said PCI local bus via a third PCI bus interface;

wherein said call controller accesses synchronous telephony signalling from said memory means and said peripheral controller accesses asynchronous call routing data from said memory means.

2. A communications system as defined in claim 1, wherein said telephony control unit is a private branch exchange (PBX) mounted on a printed circuit board.

3. A communications system as defined in claim 1, wherein a telephony features controller is connected to said synchronous bus and accesses said memory means to provide voice messaging features.

4. A communications system as defined in claim 3, wherein a telephony device circuit is connected to said synchronous bus and accesses said memory means to provide tone signalling.

5. A communication network comprising a plurality of communication systems as defined in claim 4 interconnected through a local area network.

6. A communication network as defined in claim 5, having a dedicated telephone terminal connected to each communications system whereby the terminal, operating in hands-free mode, provides a means for audio signalling.

* * * * *